United States Patent

Dolgas

[11] Patent Number: 5,394,046
[45] Date of Patent: Feb. 28, 1995

[54] STATOR AND STATOR WINDING METHOD AND APPARATUS

[75] Inventor: Patrick A. Dolgas, Clermont County, Ohio

[73] Assignee: Globe Products Inc., Huber Heights, Ohio

[21] Appl. No.: 17,111

[22] Filed: Feb. 12, 1993

Related U.S. Application Data

[63] Continuation-in-part of Ser. No. 950,262, Sep. 23, 1992, abandoned, which is a continuation-in-part of Ser. No. 948,399, Sep. 21, 1992, abandoned.

[51] Int. Cl.⁶ .............................................. H02K 1/12
[52] U.S. Cl. .................................... 310/254; 310/42; 310/179; 310/184; 310/260
[58] Field of Search ............... 310/254, 218, 67 R, 310/114, 42, 179, 180, 184, 208, 91, 71, 259, 218, 185, 194, 260, 270; 336/225

[56] References Cited

U.S. PATENT DOCUMENTS

| | | |
|---|---|---|
| 3,156,268 | 10/1964 | Moore . |
| 3,263,309 | 8/1966 | Carman et al. . |
| 3,550,645 | 12/1970 | Keogh . |
| 3,782,424 | 1/1974 | Vogel . |
| 4,228,378 | 10/1980 | Humbert .............................. 310/268 |
| 4,307,311 | 12/1981 | Grozinger ............................ 310/179 |
| 4,320,564 | 3/1982 | Aida et al. . |
| 4,335,856 | 6/1982 | Fuzita . |
| 4,399,843 | 8/1983 | Sedgewick . |
| 4,563,606 | 1/1986 | Fukasawa ............................. 310/208 |
| 4,583,696 | 4/1986 | Mosher ................................ 310/194 |
| 4,677,334 | 6/1987 | Finegold et al. . |
| 4,756,075 | 7/1988 | Dolgas . |
| 4,918,347 | 4/1990 | Takaba ................................. 310/180 |
| 4,924,125 | 5/1990 | Clark . |
| 5,057,733 | 10/1991 | Sonoda ................................. 310/42 |
| 5,233,252 | 8/1993 | Denk .................................... 310/180 |

OTHER PUBLICATIONS

Festo Model DZH; Festo Corp.; Jan. 1989; Haupaugge, N.Y.
Model EXFD200 Electrodex; Ferguson Machine Co.; (No Date) St. Louis, Missouri.
The Globe Tool & Engineering Co. Drawings F-18954 & F 18955 Dated Sep. 4, 1964 & Aug. 21, 1964; Respectively Dayton, Ohio.
Globe ASWF-5000 Exciter Stator Winding Machine, 1990; Dayton, Ohio.

*Primary Examiner*—R. Skudy
*Attorney, Agent, or Firm*—Roger S. Dybvig

[57] ABSTRACT

A wound stator for a permanent magnet electric machine has an array of coils on the outer rim of a generally cylindrical stator body. The stator coils are wound directly on the stator body by providing the stator body with a plurality of mutually circumferentially-spaced, coil-retaining and forming members around which the ends of the stator coils are coursed so that the coil sides project in a direction parallel to the center axis of the stator. Wire connections are formed between coils of a phase, and wire loops are formed between the last wound coil of one phase and the first wound coil of a subsequently wound phase. Mechanisms are provided for clamping the stator start wires and for temporarily retaining the wire loops.

4 Claims, 8 Drawing Sheets

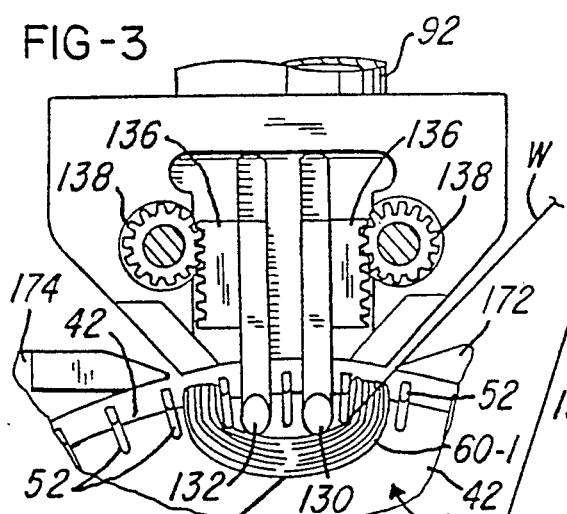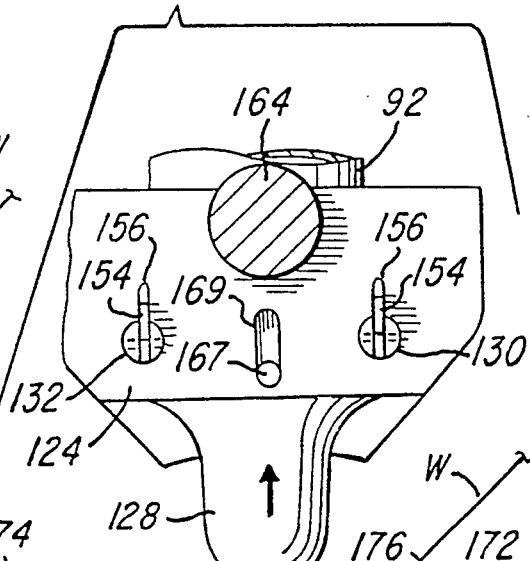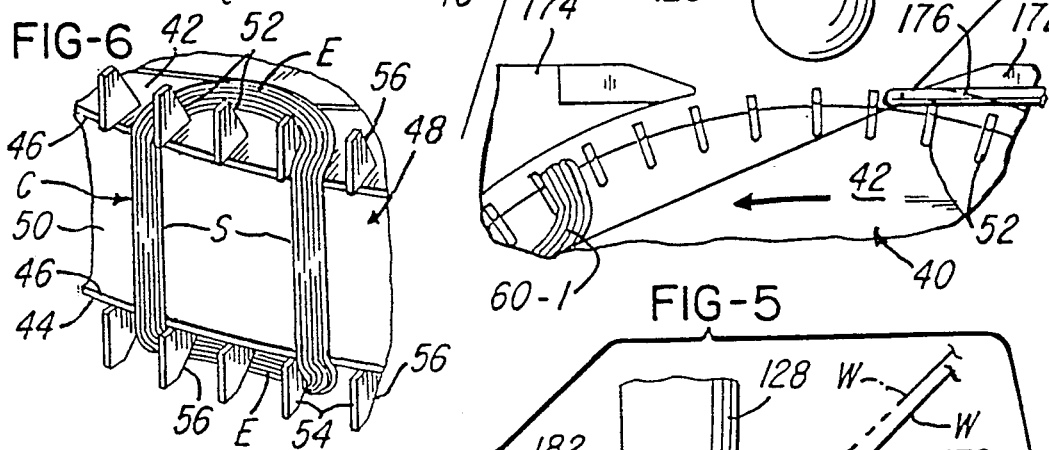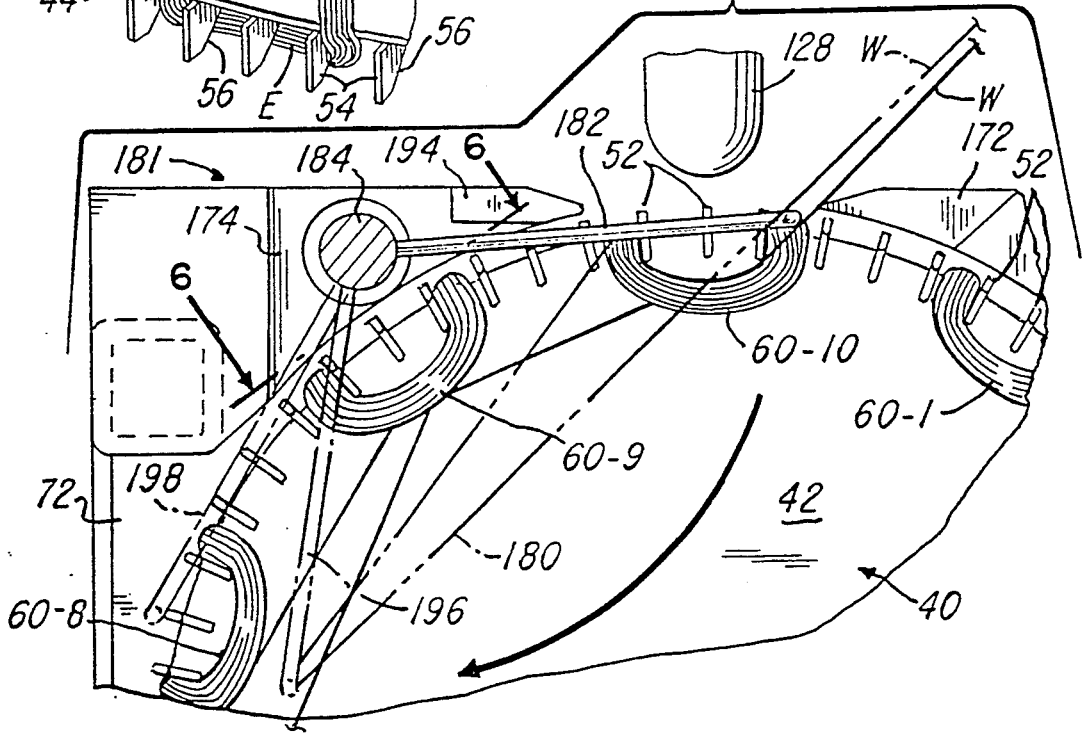

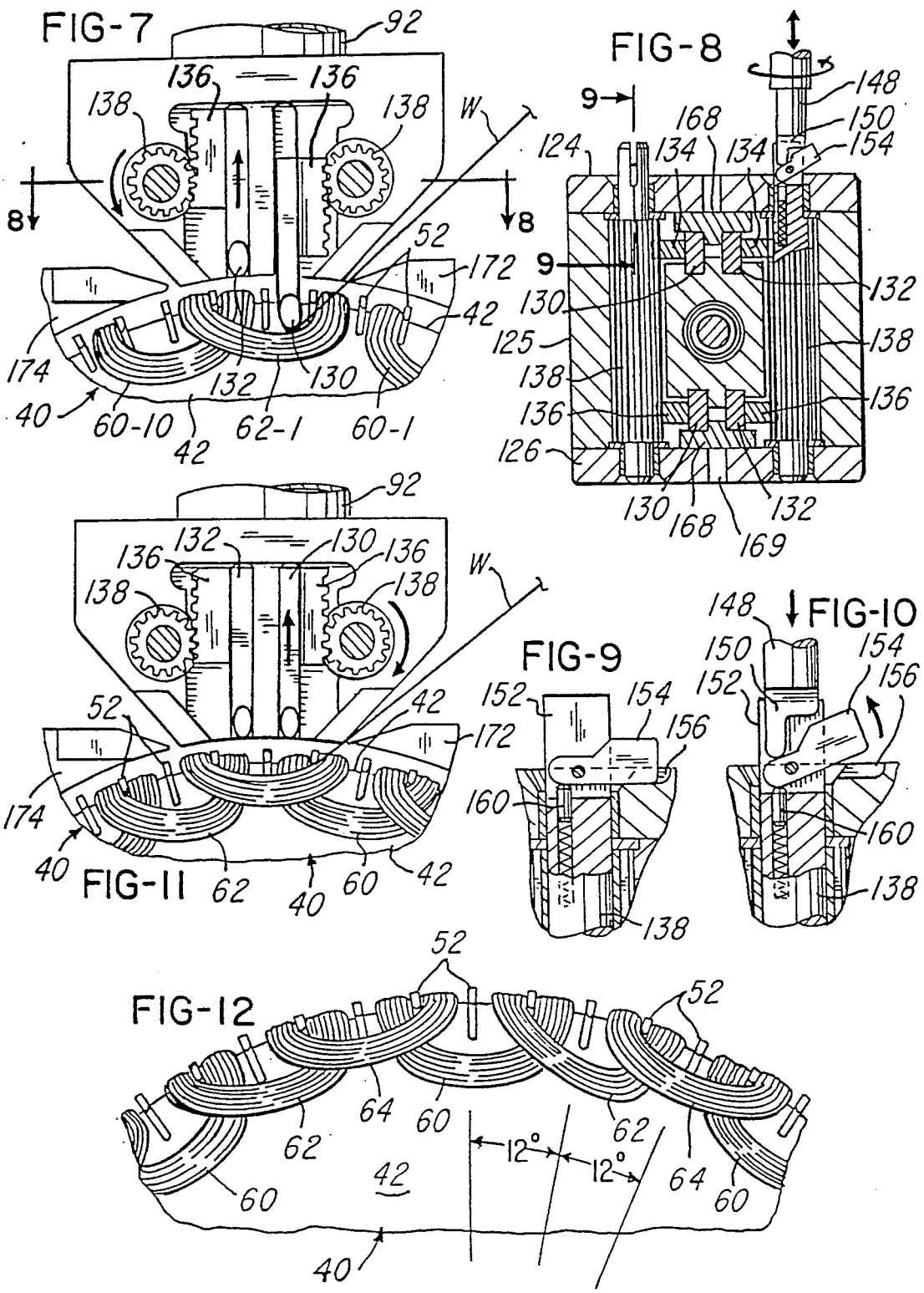

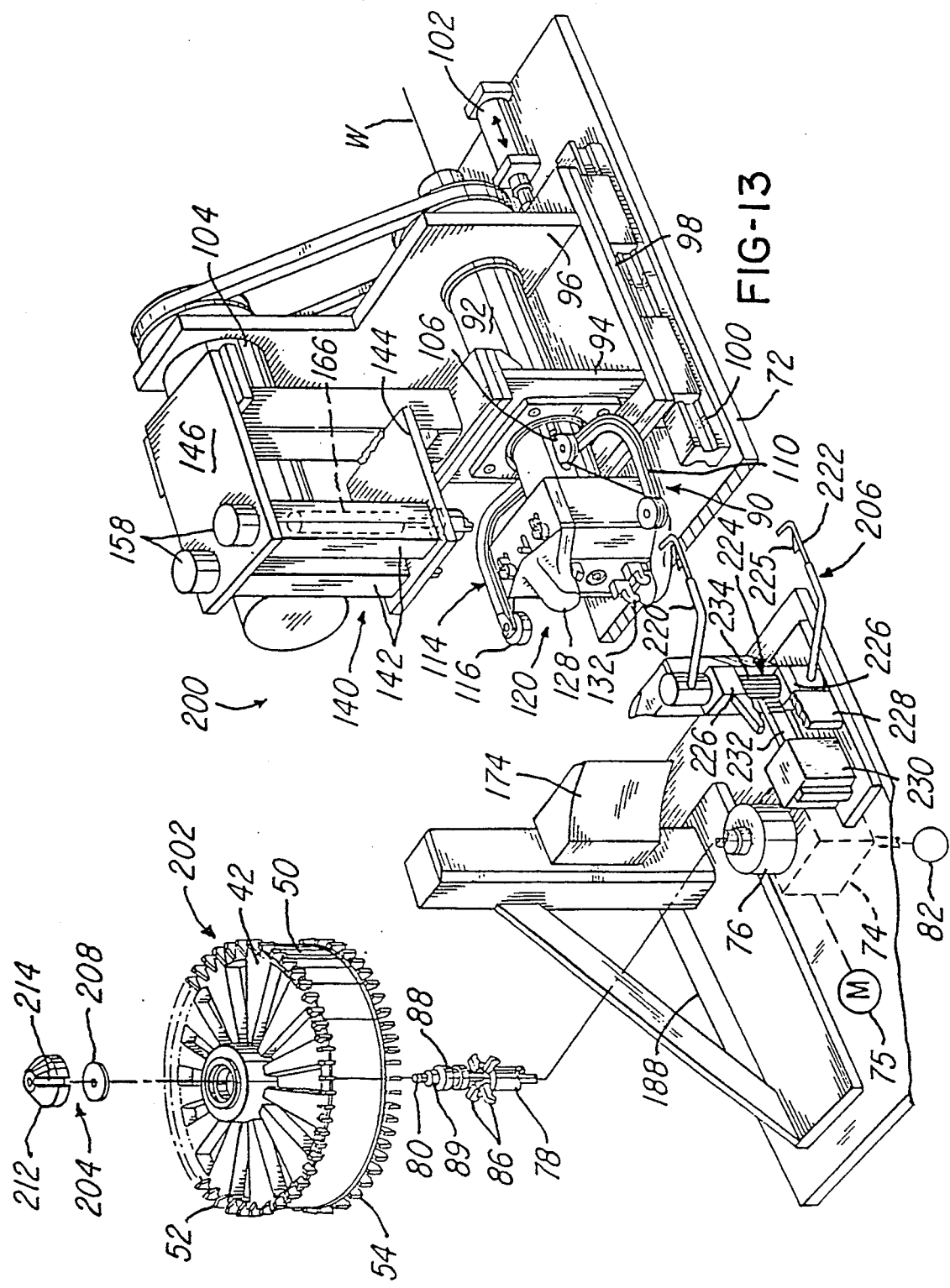

STATOR AND STATOR WINDING METHOD AND APPARATUS

CROSS-REFERENCE TO RELATED APPLICATIONS

This is a continuation-in-part of application of Patrick A. Dolgas and Ballard E. Walton, Ser. No. 07/950,262, filed Sep. 23, 1992, now abandoned, which was a continuation-in-part of application of Patrick A. Dolgas and Ballard E. Walton, Ser. No. 07/948,399, filed Sep. 21, 1992, now abandoned.

BACKGROUND OF THE INVENTION

This invention relates to a stator and a stator winding method and, although not necessarily so limited, more particularly to a stator having field coils wound on the outer, cylindrical rim of a cylindrical stator core.

This invention was developed for use in winding field coils on stators for motors having internal stators of the type disclosed in U.S. Pat. No. 4,924,125. Such stators are used with surrounding rotors that rotate about an axis coincident with the center axis of the stator. However, aspects of this invention may be useful for other types of electric motor stators.

A key feature of stators of the type disclosed in said U.S. Pat. No. 4,924,125 is th the sides of the stator coils are located on the outer rim surface of the body of the stator, in parallel relation to the center axis of the stator; there are no coil-receiving slots in the stator body itself. In order to manufacture stators of this type, the practice has been to wind the coils separately from the stator body and then to mount the coils onto the stator body, forming the coils as desired to the contours of the stator body and then mounting them, as by tying them together, on the stator body. The processes used in the past are cumbersome, time-consuming, and unduly expensive. Accordingly, there is a need for an improved method and apparatus for manufacturing such stators.

SUMMARY OF THE INVENTION

This invention provides an improved stator having an array of coils on the outer rim of a generally cylindrical stator body. In accordance with this invention, the stator coils are wound directly on the stator body by providing the stator body with a plurality of mutually circumferentially-spaced, coil-retaining and forming members around which the ends of the stator coils are coursed so that the coil sides project in a direction parallel to the center axis of the stator. Connections are formed between coils of a phase, and wire loops are formed between the last wound coil of one phase and the first wound coil of a subsequently wound phase.

BRIEF DESCRIPTION OF THE DRAWINGS

FIG. 2 also shows the stator of this invention in phantom.

FIG. 3 is a fragmentary top plan view of a portion of the machine of FIG. 1, including a center winding form from which a top plate has been removed to reveal details of construction, and also including a portion of a stator being wound.

FIG. 4 is a view similar to FIG. 3, but showing the center winding form with its top plate in position and illustrating a later stage in the winding of the stator than that illustrated in FIG. 3.

FIG. 5 is a fragmentary top plan view similar to FIGS. 3 and 4 but showing a slightly different portion of the machine. FIG. 5 illustrates a still later stage in the winding of the stator.

FIG. 6 is a fragmentary perspective view, as viewed in the direction of arrows 6—6 of FIG. 5, of a portion of the stator core and a coil wound thereon.

FIG. 7 is a view similar to FIG. 3 at still a later stage in the winding of the stator.

FIG. 8 is a cross sectional view taken along line 8—8 of FIG. 7 of a portion of the center winding form and a driver used with the center winding form.

FIG. 9 is an enlarged fragmentary cross section of the center winding form taken along line 9—9 of FIG. 8.

FIG. 10 is view similar to FIG. 9 but also shows a driver associated therewith.

FIG. 11 is a view similar to FIG. 7 at a still later stage in the winding of the stator.

FIG. 12 is fragmentary top plan view of the stator diagrammatically illustrating the stator after it is fully wound.

FIG. 13 is a fragmentary, partly exploded perspective view, with parts broken away, of a portion of a second embodiment of a winding machine and an unwound stator in accordance with this invention.

FIG. 14 also shows the stator of this invention in phantom.

DETAILED DESCRIPTION

Figure 16:
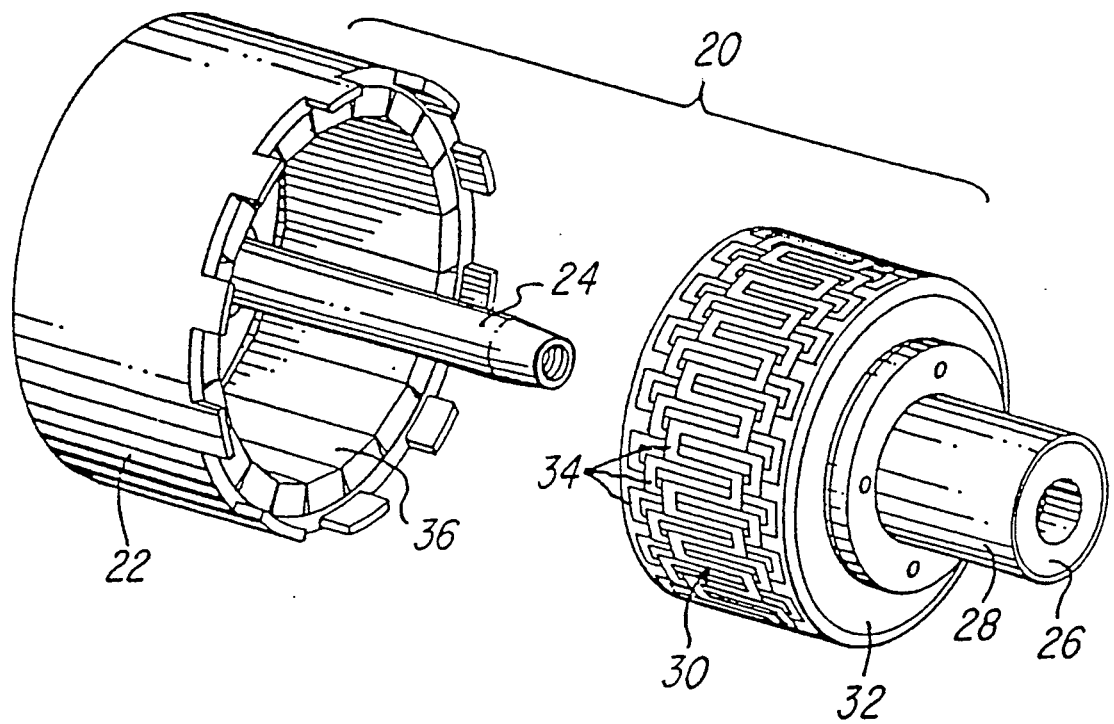
FIG. 16 is an exploded, partly diagrammatic, perspective view of portions of a prior art electrical machine.

The present invention relates to the type of electrical machine, which may be a motor or an alternator, generally designated 20 in FIG. 16, having a cup-shaped rotor 22, with a center shaft 24 that is mounted by bearings 26 in the hub 28 for rotation of the rotor 22 about the center axis of a stator, generally designated 30. The stator 30 includes a cylindrical core 32, which may be made from a glass filled resin, and a plurality of shallow, pole-forming coils 34 wound from magnet wire. A plurality of permanent magnets 36 are mounted within the rotor 22 which cooperate with the wound poles so that the machine 20, when assembled, will function as either a motor or as an alternator. This type of electrical machine is disclosed in the above-mentioned U.S. Pat. No. 4,924,125.

Figure 1:
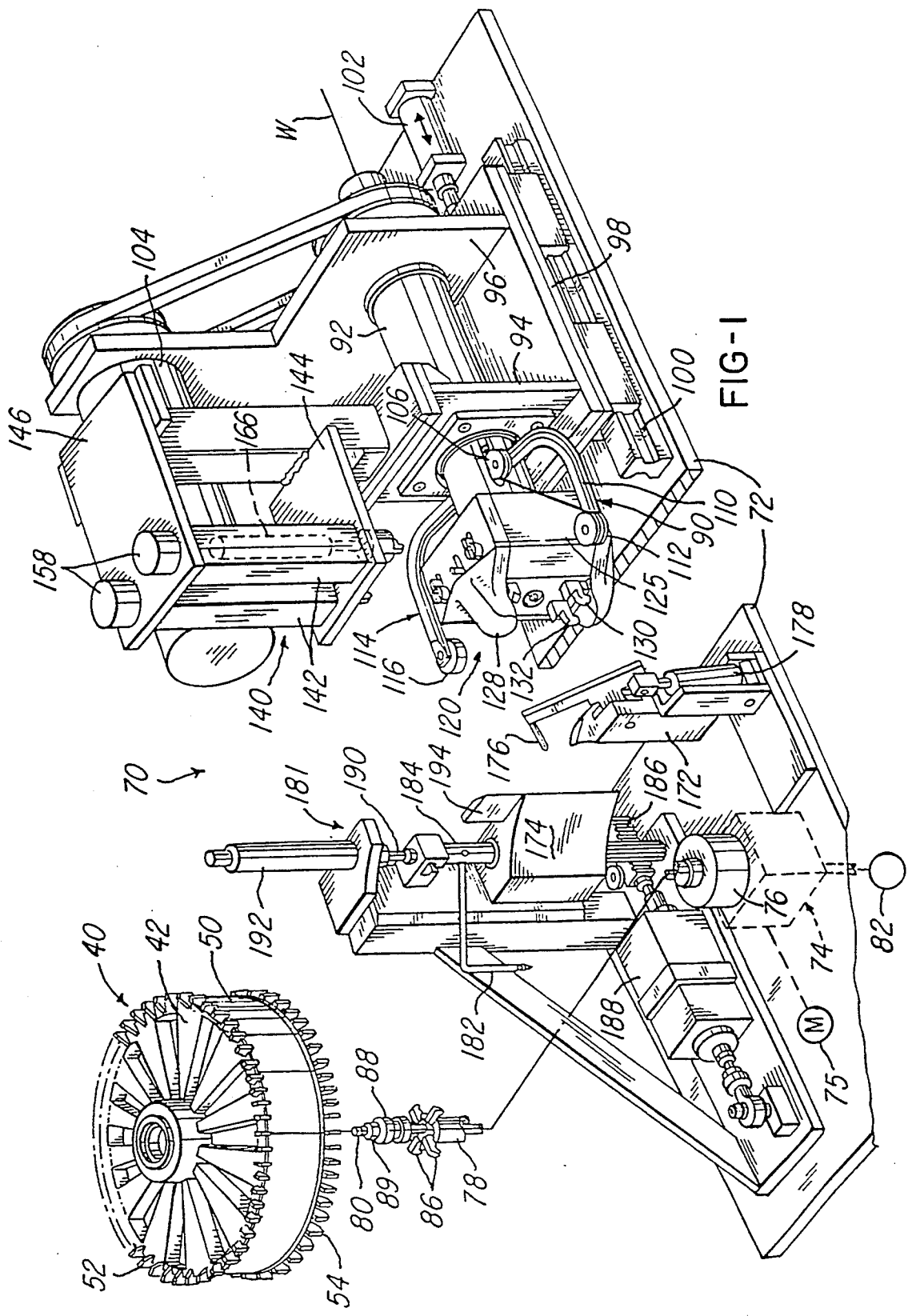
FIG. 1 is a fragmentary, partly exploded perspective view, with parts broken away, of a portion of a winding machine and an unwound stator in accordance with this invention.

With reference to FIG. 1, a stator core, generally designated 40, is illustrated which is based on the prior art device shown in FIG. 16 but modified in accordance with this invention. The stator core 40 of this invention has a circular first end face 42 and a circular second end face 44. Referring also to FIG. 6, both end faces 42 and 44 have outer margins 46 spaced by and joined to a cylindrical outer wall 48. (Although not pertinent to the instant invention, the outer wall 48 has a mild steel band (not shown) covered by a band of insulating material 50 mounted over a glass-filled resin substrate.) As in the prior art, the end faces 42 and 44 are centered on a common axis which is coincident with the center axis of the outer wall 48.

The stator core 40 is modified in accordance with this invention to include a first set of axially-outwardly projecting coil-retaining and forming members 52 mounted in mutually-spaced relation on the outer margin of its first end face 42, and to include a second set of axially-outwardly projecting coil-retaining and forming members 54 mounted on the outer margin of its second end face 44. Individual ones of the coil-retaining and forming members 54 of the second set are aligned with individual ones of the coil-retaining and forming members 52 of the first set. The coil-retaining and forming members 52 and 54 project axially further outwardly from the end faces 42 and 44, respectively, than any of the coils wound on the stator core 40, as will be described below. To help guide the wire segments forming the wound poles, as will be discussed below, the coil-retaining and forming members 52 and 54 have inner faces, designated 56, which are their faces nearest the center axis of the stator core 40, which faces slope both radially and axially outwardly from their associated end faces 42 and 44.

Other aspects of the stator will be understood from the following description Referring to FIG. 6, the poles wound on the stator core 40 are formed from individual coils "C" each having sides "S" extending axially along the outer wall 48 in parallel relation to the center axis of the stator, and ends "E" extending over the first and second core end faces 42 and 44. Corners of the coils "C" joining the sides "S" and the ends "E" are formed around aligned pairs of the first and second sets of coil-retaining and forming members 52 and 54 and extend over the end faces 42 and 44. In the particular embodiment illustrated in the drawings, these aligned pairs of coil-retaining and forming members 52 and 54 are located on opposite sides of intermediate coil-retaining and forming member 52 and 54 which are spanned by the coil "C".

As will be understood by reference first to FIGS. 5 and 6, and then to FIGS. 7 and 12, all of the coils that form a first phase, which coils are designated numbers 60-1, 60-2, 60-3 . . . 60-10, are wound in seriatim on the stator core 40 in mutually equally-spaced relation around the circumference of the stator core 40. This is followed by the winding in seriatim of equally-spaced second phase coils, designated 62-1, 62-2, 62-3 . . . 62-10, and then by the winding in seriatim of equally-spaced third phase coils, designated 64-1, 64-2, 64-3 . . . 64-10. (Aspects of this invention may be applicable to stators having other than three phase windings, but this invention will most often be applied to three phase stators.)

Figure 2:
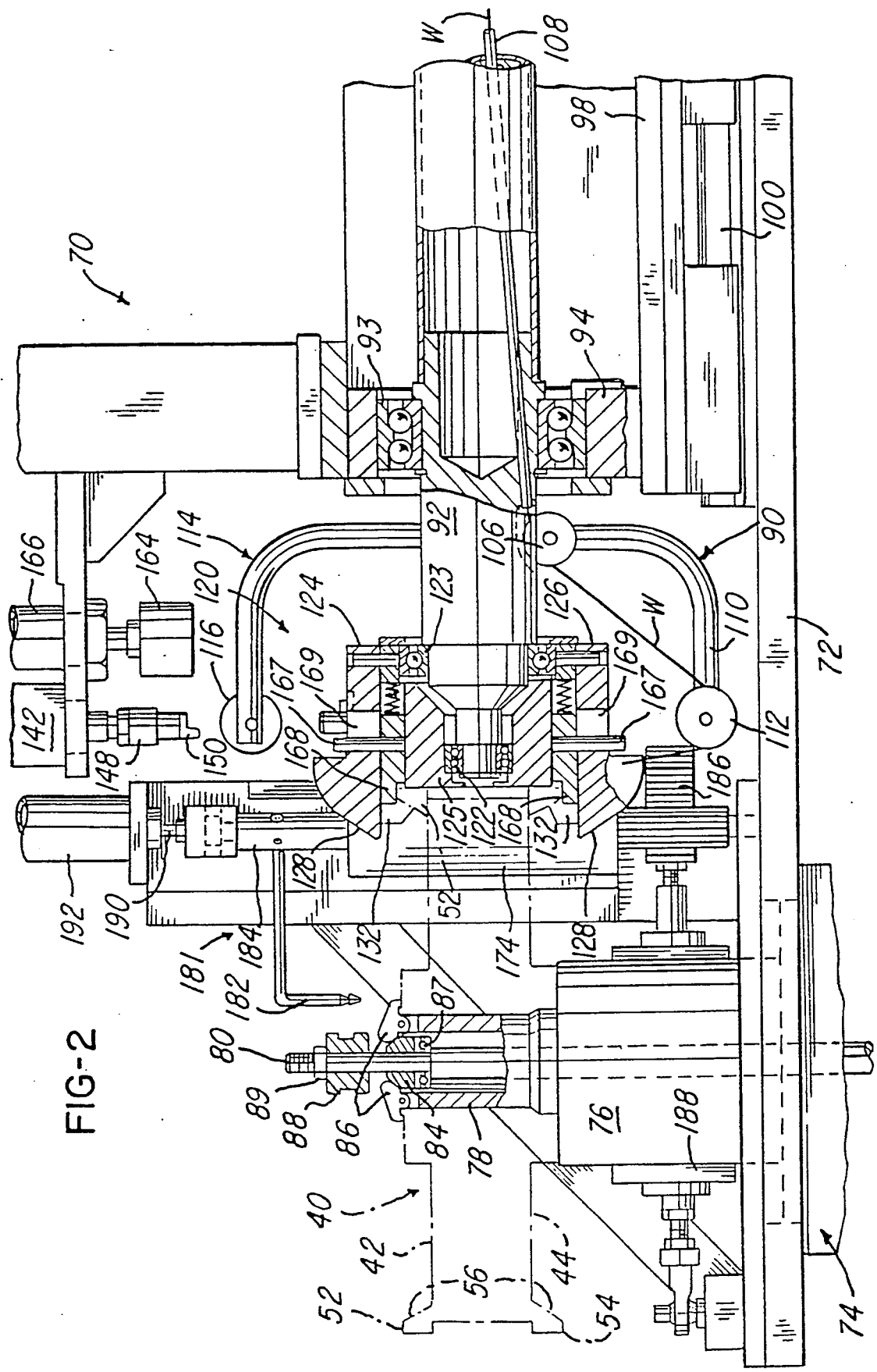
FIG. 2 is a fragmentary side elevational view, with parts broken away and in cross section, of the machine of FIG. 1 on a larger scale than FIG. 1.

With reference to FIGS. 1 and 2, a stator winding machine for winding stators in accordance with this invention is generally designated 70 and includes a suitable frame 72 on which a stator core indexing apparatus 74 driven by suitable drive motor 75 is mounted. The indexing apparatus 74 includes a support block 76 and an upwardly extending spindle 78 to locate the stator cores 40 in position to be wound, which is the position illustrated by the stator core 40 shown in phantom lines in FIG. 2. A stator core to be wound is clamped to the indexing apparatus 74 in any suitable fashion, as by the illustrated clamp rod 80 which extends upwardly through the indexer spindle 78 and is operated by an air actuator 82. As is apparent, the clamp rod 80 carries a lower camming member 84 that presses upwardly on pivotal clamping plates 86 to lock a stator 40 to the spindle 78 and an upper camming member 88 that moves downwardly to pivot the clamping plates 86 to a position to permit removal of a wound stator and replacement by an unwound stator core. Lower camming member 84 is mounted on a bearing 87 so that it may rotate with the stator being wound when it is indexed as will be described below. Upper camming member 88 may be affixed, as by mutually cooperating threads, to the upper end of the clamp rod 80 and held non-rotatably thereto a hexagonal stop nut 89. The indexing apparatus 74 is only diagrammatically illustrated in the drawings. An example of an indexing apparatus suitable for the purposes of this invention is known as a Model EXFD200 Electrodex, which is available from Ferguson Machine Company, 11820 Lackland Road, St. Louis, Mo. 63146.

Coils are wound on a stator core 40 mounted on the indexing apparatus 74, in what may be referred to as a "winding station", by means of a rotating wire-guiding flier 90 that is connected to a rotatable flier spindle 92 which is mounted for rotation by bearings 93 on a pair of spindle support plates 94 and 96 mounted vertically on a horizontal carriage 98 which is mounted for movement along guide tracks 100 on the machine frame 72 for movement toward and away from the winding station by operation of a carriage drive air actuator 102. The flier spindle 92 is driven by a suitable motor 104 mounted on the spindle support plate 96. The flier 90 includes a wire exit pulley 106 from which wire exits from a wire guide tube 108 in the flier spindle 92, a flier arm 110 that extends outwardly from the flier spindle 92, and a flier guide pulley 112 at the end of the flier arm 110 which, upon rotation of the flier 90, causes insulated magnet wire W through the flier spindle 92 to be wound into coils "C". The flier arm 110 and the pulley 112 are balanced by a counterbalancing arm 114 and weight 116. During rotation of the flier 90, as is well known, the wire W is drawn from a source (not shown) of wire under tension. As is conventional with flier-type winders, at the beginning of the winding of a stator, the wire exiting from the flier, which has been cut free from the previously wound stator, is gripped by a suitable clamp (not shown).

In order to form the wires into the coils "C", a winding form assembly, generally designated 120, is mounted by bearings 122 and 123 on the end of the flier spindle 92 nearest the winding station. Winding form assembly 120 comprises a generally rectangular, central body 125 on which is mounted an upper wire guide plate 124 and a lower wire guide plate 126, both of which have beak-like, arcuately convex, wire guide portions 128 that extend, respectively, above and below the end faces of a stator core 40 in the winding station.

With reference to FIGS. 1, 2, 3, 7 and 8, the winding form assembly 120 further includes two pairs of movable coil formers, namely a pair of upper and lower right side coil formers 130 (as viewed in FIGS. 1, 3, 7 and 8) and a pair of upper and lower left side coil formers 132. With reference to FIG. 3, the two pairs of coil formers 130 and 132 are extended over a stator core 40 at the winding station during the winding of the coils 60 of the first phase. When in this position, the coil formers 130 and 132 cooperate, respectively, with the upper and lower wire guide plates 124 and 126 to cause the wire W to wrap around upper and lower pairs of the coil-retaining and forming members 52 and 54 fixed to the end faces 42 and 44 of the stator 40 and also around the upper and lower pairs of movable coil formers 130 and 132. The movable coil formers are so extended over the stator core end faces 42 and 44 that the coil ends "E" are formed thereby further toward the center axis of the stator core 40 than would be the case if the movable coil formers 130 and 132 were retracted. As will be seen, this provides space for the winding of coils of subsequent phases.

With reference to FIG. 7, one side of each second phase coil 62 overlaps one side of a first phase coil 60. To avoid interference between the left side coil formers 132 and the first phase coils 60, the left side coil formers 132 are retracted when winding coils 62 of the second phase. The right side coil formers 130 remain extended so that the portion of the second phase coil end which does not overlap a first phase coil is formed by the same distance toward the center axis as the ends of the first phase coils. As shown in FIG. 11, each coil 64 of the third phase overlaps one first phase coil 60 and one coil 62 of the second phase, the portion of the second phase coil 62 being overlapped being that portion whose end is formed toward the center axis of the stator core 40 by the right side coil former 130 and shown in FIG. 7. As is evident, both pairs of coil formers 130 and 132 must be retracted in preparation for the winding of the third phase coils 64 to avoid interference with the previously wound coils.

Referring to FIGS. 1, 2, 4 and 8 through 10, extension and retraction of the right side coil former 130 is accomplished by a drive mechanism comprising a pair of racks 134 and 136 connected, respectively, to the upper and lower formers 130, and engaged by a vertical pinion drive shaft 138 mounted by bearings in the upper 14 and lower guide plates 124 and 126. A pinion drive actuator assembly 140 is mounted on the carriage 98 above the winding form assembly 120. The pinion drive actuator assembly 140 includes a vertically oriented air actuator 142 mounted for rotation on a pair of horizontal support plates 144 and 146. Actuator 142 has a nonrotating piston (not shown) and may be of the type known as Festo Model DZH which is available from Festo Corporation, 395 Moreland Road, Hauppauge, N.Y. 11788. The depending end of its piston rod, designated 148, has a drive key 150 adapted to enter a slot 152 in the top of the pinion drive shaft 138 upon actuation of the actuator 142. Upon entry of the key 150 into the slot 152, a locking dog 154, which normally fits into a locking groove 156 in the winding form upper plate 124 to prevent retraction of the right side movable coil former 130, is pivoted out of the locking groove 156 to release the pinion drive shaft 138 for rotation. At this time, a rotary air actuator 158 affixed to the top of the upper support plate 146 and drivingly connected to the air actuator 142 is energized to rotate the pinion drive shaft 138 and thereby retract the movable right side coil formers 130. Later on, when the piston rod 148 is retracted to permit the subsequent winding of coils, the locking dog 154, which is biased by a spring-loaded pin 160, frictionally bears against surfaces of the upper wire guide plate 124 to overcome any tendency that the drive pinion 138 may have to rotate to extend the movable coil formers 130. It will be apparent by now that the key 150 can be lowered again into the slot 152 and the operation of the rotary actuator reversed to extend the coil formers 130 for the winding of the next stator.

The extension and retraction of the left side movable coil formers 132 is accomplished by a duplicate mechanism for which like parts are given like reference numbers.

In the operation of the stator winder 70, the winding form assembly 120 is retracted away from the winding station to enable removal of a wound stator and replacement by an unwound stator core 40. The orientation of the winding form assembly is maintained at this time by a winding form brake member 164 (FIG. 2) driven downwardly into engagement with the top surface of the winding form assembly by an air actuator 166. (The brake member 164, is applied whenever the winding form assembly is retracted. Otherwise, the winding form assembly could rotate out of its proper orientation since it is rotatably mounted with respect to the flier spindle 92.) After an unwound core is clamped to the indexing apparatus 74, the winding form assembly 120 is advanced, by operation of the carriage drive cylinder 102, to move the winding form assembly 120 into position for winding the first coil 60-1 of the first phase. At this time, rotation of the winding form assembly 120 is prevented by the engagement of a pair of stabilizing plates 168 (FIG. 2) with the top and bottom surfaces, respectively, of the three pairs of uppermost and lowermost wire-retaining and forming members 52 and 54 straddled by the upper and lower wire guide plates 124 and 126, and the brake member 164 is retracted by operation of its air actuator 166. The stabilizing plates 168 are preferably spring biased and guided by pins 167 that extend through slots 169 in the upper and lower wire guide plates, respectively, so that they will assuredly engage the stator core 40 without damaging it. At this time, the movable coil formers 130 and 132 are extended as shown in FIG. 3 and, following retraction of the pinion drive actuators 138, the flier 90 is then rotated by rotation of its spindle 92 to wind the coil 60-1.

With reference to FIGS. 2 and 3, it can be seen that, during the winding of the first coil 60-1, as the flier 90 rotates to cause the wire W to move over the coil-forming wire guide portions 128 of the winding form assembly 120, the wire is forced thereby to extend a substantial distance closer to the center axis of the stator core 40 than the inner faces 56 of the coil-retaining and forming members 52 and 54. As the flier 90 continues to rotate, drawing the wire W off the wire guide portion 128, the wire W tends to snap outwardly toward and against the surfaces of the movable coil formers 130 and 132 that face generally toward the center axis of the stator core so that the coil 60-1 is tightly and securely wound in the position illustrated in the drawings.

During the winding operation, the wire W is prevented from hooking over any of the adjacent coil-retaining and forming members 52 and 54 by a pair of shield members 172 and 174 located, respectively, on opposite sides of the winding form assembly 120 and closely adjacent to the stator core 40 being wound. The shields 172 and 174 also insure that the wire W is directed against the winding form at all times when the flier 90 is rotating.

After the winding of the coil 60-1, the flier 90 is stopped approximately in the position shown in FIG. 1 in preparation for the retraction of the carriage 98 to permit the stator 40 to be indexed. Prior to retraction of the carriage 98, a pivotal wire-guiding hook or pin 176 is pivoted by operation of an associated air actuator 178 into the position shown in FIG. 4, where it holds the wire leading from the coil 60-1 to the flier 90 generally over the stator core 40 and prevents the wire from moving between the stator core 40 and the winding form assembly 120 when the carriage 98 is retracted, which could interfere with the subsequent operation of the machine.

The winding form 120 can now be retracted and the stator 40 indexed by operation of the indexing apparatus 74 whereupon the parts reach the position thereof illustrated in FIG. 4. The foregoing operations are repeated until all of the coils 60 of the first phase have been wound. Referring to FIG. 5, it will be noted that the connecting wires between the first phase coils 60 extend over the end face 42 which is uppermost in FIG. 5, where they are safe from damage.

After the completion of the first phase coils, and before the retraction of the carriage 98 to permit the next indexing movement of the stator core 40, a lead wire loop 180, shown in FIG. 5, is preferably formed over the top of the stator end face 42. This is accomplished by means of a looping assembly, generally designated 181 in FIGS. 1, 2 and 5, and comprising an L-shaped looping pin 182 mounted on a vertical support shaft 184 driven by a rack 186 which in turn is driven by a compound air actuator 188. The upper end of the support shaft 184 is coupled to the piston rod 190 of an air actuator 192 by which the support shaft 184, and accordingly the looping pin 182, can be raised and lowered.

In operation, at the end of the winding of the last coil of the first phase, the looping pin 182, which is in its raised position, is pivoted by operation of the rack 186 to the position shown in full lines in FIG. 5 against or nearly against a stop plate 194 in the top of the left side shield 174. The looping pin 182 is then lowered so that its vertical leg is positioned to engage the segment of wire W leading from the last coil of the first phase to the flier 90. The looping pin 182 is then pivoted back to the position thereof indicated by phantom lines 196 so as to draw a loop 180 in the wire. After the loop 180 is drawn, the carriage 98 is retracted and the stator indexed as before, but through a lesser angle, to reposition the stator core 40 for receiving the first coil 62-1 of the second phase. (In the illustrated embodiment, the index from the end of one phase to the beginning of the next is through 12 degrees as shown in FIG. 12.) During the indexing of the stator core 40 at this time, the wire loop 180 is held against the vertical leg of the looping pin 182 by operation of a conventional dancer arm or other wire take-up device (not shown) associated with the source of wire under tension. When the stator core 40 is next indexed after the winding of the first phase two coil 62-1, the wire loop 180 moves away from the vertical leg of the looping pin 182, which can then be raised out of the way and returned to its home position, shown by phantom lines 198 in FIG. 5, where it will not interfere with the removal of the wound stator.

Those familiar with the art will readily understand that the foregoing operations are repeated as necessary to complete the winding of the stator, at which time it is removed and replaced by an unwound stator.

It will be noted that, the entirety of the ends of all of the coils of all three phase coils are located over the stator end faces 42 and 44 and closer to their associated faces 42 and 44 than are the outer extremities of the coil-retaining and forming members 52 and 54.

Figure 14:
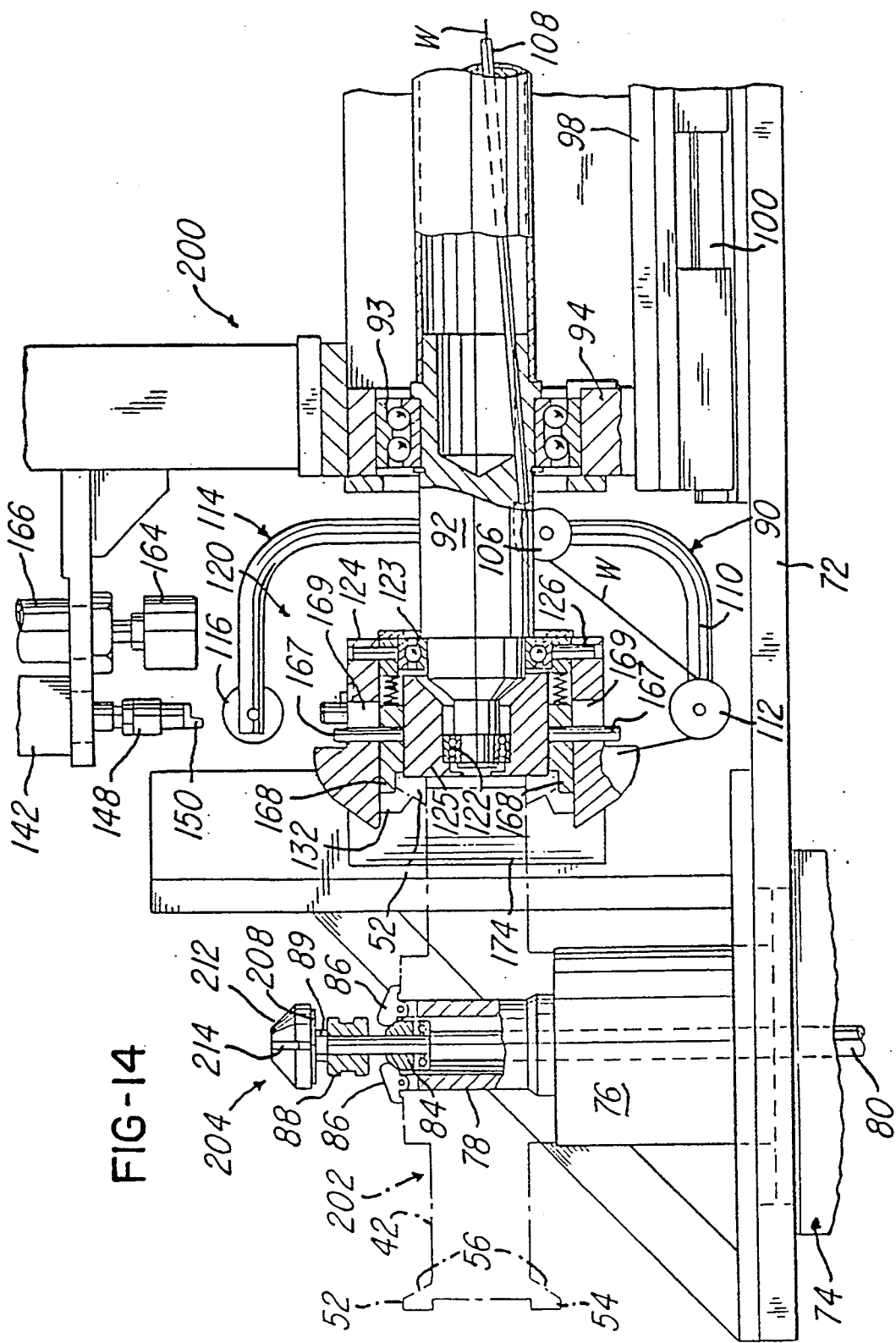
FIG. 14 is a fragmentary side elevational view, with parts broken away and in cross section, of the machine of FIG. 13 on a larger scale than FIG. 13.
Figure 15:
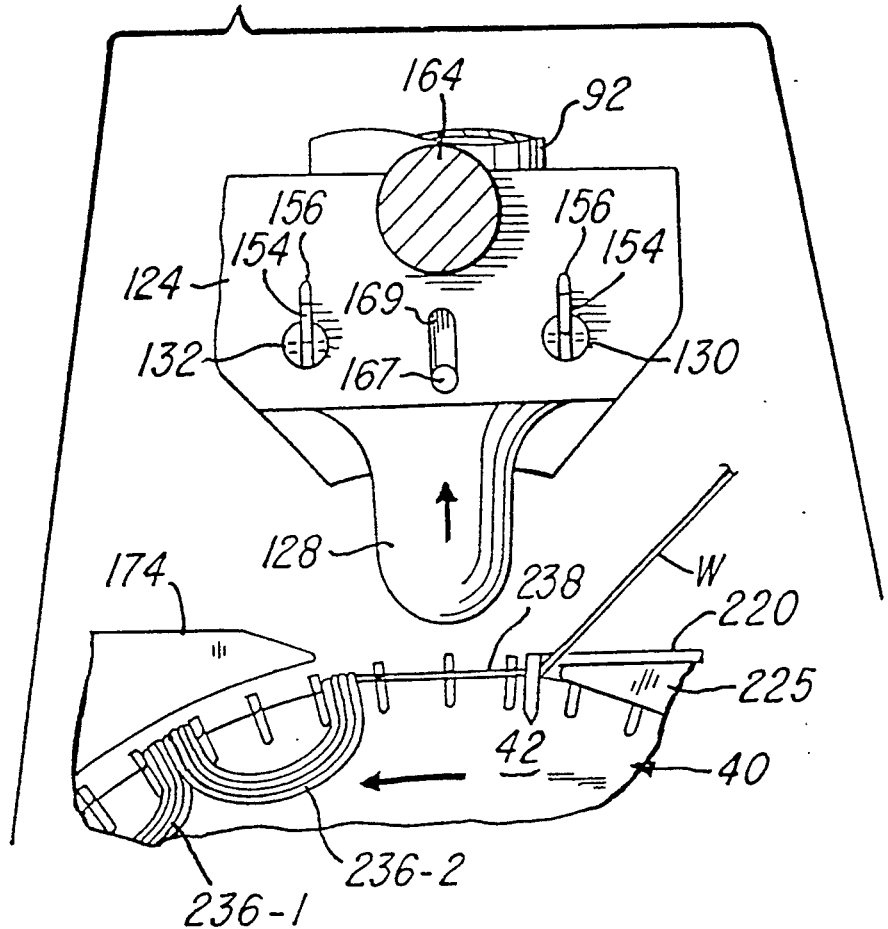
FIG. 15 is a view similar to FIG. 4, illustrating a stage in the winding of a stator using the machine of the embodiment of FIGS. 13 and 14.

FIGS. 13, 14 and 15 illustrate a second embodiment of a winding machine, generally designated 200, used to wind a stator, generally designated 202. The same reference numbers are used in these figures for parts of the machine 200 and the stator 202 that are essentially the same as corresponding parts of the machine 70 and the stator 40 of FIGS. 1 through 12, and such parts are not further described herein.

The machine 200 differs from the machine 70 in that the machine 200 includes a wire clamp and loop holder assembly, generally designated 204, and further includes a wire positioning assembly, generally designated 206. In the machine 200 of the second embodiment, the wire loop forming function provided by the wire clamp and loop holder assembly 204 is performed manually or with the use of suitable tools, as will be further described below. Therefore, the wire looping assembly 181 of the machine 70 of the first embodiment is not used in the machine 200. The wire positioning assembly 206 is used in lieu of the wire guide pin 176 and its air actuator 178. Except as described above, the machine 200 may be identical in construction and, except as described below, in operation to the machine 70 of the first embodiment.

Wire clamp and loop holder assembly 204 is mounted on the upper end of the stator clamp rod 80 and includes a clamp washer 208 freely rotatably mounted on the clamp rod 80 and supported on top of the stop nut 89, and further includes a clamp member 212 threaded onto the top end of the clamp rod 80 so that it would, when rotated, be moved toward and away from the clamp washer 208. In use, the operator of the machine 200 can, after mounting an unwound stator core in the winding station, grasp the free end of the wire segment extending from the flier 90, place it between the clamp washer 208 and the clamp nut 212, and clamp down on the wire segment by rotating the clamp nut 212 to move it toward the clamp washer 208. This clamped wire segment is the start wire for the stator. Thus, it leads into the first coil to be wound. If the wire segment is looped in the appropriate direction around the shaft 80 before it is clamped between the clamp washer 208 and the clamp nut 212, that wire segment will simply unwind from the shaft 80 during the winding of the coils of the first phase. At any time thereafter, the operator may release the free end of the clamped wire segment by reversely rotating the clamp nut 212. In practice, this can conveniently be done immediately after the coils of the first phase are wound.

To provide a wire loop holding function, i.e. to temporarily hold a between-phase wire loop, such as the wire loop 180 described above, a vertically-extending groove 214 is formed along the outer edge of clamp nut 212 in a position so located that the groove 214 faces away from the flier 90 when the clamp nut 212 is tightened against the clamp washer 208—a position which is 90 degrees to the left of the position illustrated in FIG. 14. In use, after the first phase coils are wound and the stator lead wire unclamped, the operator can grasp the wire segment between the flier 90 and the last-wound coil, pull it to form a loop of wire, either by hand or with a suitable hook-like tool (not shown), and place the bight of the wire loop into the groove 214. The stator 202 can then be indexed to enable the winding of the coils of the second phase. Because the clamp nut 212 does not rotate as the stator is indexed, the loop is moved out of the groove 214 during the winding of the second-phase coils and simply overlies the stator 202, out of the way of the flier 90. A loop can similarly be formed between the second-phase coils and the third-phase coils and temporarily engaged in, and then removed from, the clamp nut 212 in the same way as the wire loop between the first and second phases.

The wire positioning assembly 206 comprises a pair of wire-guiding pins or hooks, namely an upper hook 220 and a lower hook 222, connected to the upper and lower ends of a vertical drive shaft 224 rotatable in vertically-spaced bearing blocks 226 supported by a bracket 228. A hook-operating air actuator 230, which is preferably (and conventionally) mounted in any suitable fashion for limited pivotal movement is adapted to drive a rack 232 engaged with a splined center section 234 of the drive shaft 224. In operation, both hooks 220 and 222 are pivoted so that their free ends are within the orbit of the flier 90 after the winding of each coil and then pivoted to a position remote from the winding area after the stator is repositioned before the flier begins to rotate to wind the next coil.

The machine 200 has two pins or hooks 220 and 222, instead of the single wire positioning pin 176 of the first embodiment, to accommodate for circumstances in which the stator is so wound that the flier stops below as well as above the stator. With reference to FIG. 15, the stator 202 is wound by a procedure in which the first coil, designated 236-1, of the first phase is wound in one direction and the stator is then indexed through only one-half of angle through which the stator 40 is indexed in the first embodiment described above. The second coil, designated 236-2, of the first phase is then wound with one of its sides located side-by-side in abutment with a side of the first- wound coil 236-1. The second coil 236-2 is wound in the opposite direction to the first coil so that the abutting sides of the two coils run electrically in the same direction. This opposite direction of rotation for alternate coils is continued throughout the winding of the stator. Accordingly, the flier 90 will stop above the stator 40 after the winding of half of the coils, i.e. those formed by rotation of the flier in one direction, and below the stator after the winding of the other half of the coils, i.e. for the alternate coils formed by rotation of the flier 90 in the opposite direction.

With continued reference to FIGS. 13, 14 and 15, the pins or hooks 220 and 222 are each provided with a cam plate 225, the purpose of which is to cam the wire segments engaged by the wire hooks 220 and 222 toward their free ends. When positioned within the orbit of rotation of the flier 90, the free ends of the hooks 220 and 222 are so located that the wire segments engaged thereby are in substantial vertical alignment with the coil side of the last coil from which the wire lead extends, but with the portion of the wire engaged by the hook 220 or 222, as the case may be, held radially closer to the center of the stator so that the stator can be indexed without concern that the wire lead will cross over into the area of the next coil to be wound. (In FIG. 15, the stator 202 has been indexed to locate it in position for the winding of the third coil of the first phase, so that the coil side from which the last wire lead, designated 238, extends has been indexed away from the position it occupied below the free end of the hook 220 at the end of the winding of the coil 236-2.)

As is evident, one of the hooks 220 or 222 will not engage a wire segment when the other of the hooks 220 or 222 is engaged with a wire segment, so that it would not be necessary to pivot both hooks 220 and 222 at the same time. It will also be evident that there may be cases in which only one of the hooks 220 or 222 is used to engage the wire segments leading from the coils. This will depend upon the winding pattern for the particular stator being wound.

The embodiment of FIGS. 1 through 12 is preferred for automatic production of stators, but may advantageously be modified to include the wire positioning assembly of FIGS. 13, 14 and 15. The second embodiment shown in FIGS. 13, 14 and 15, is useful and may in some cases be preferred for low production, laboratory, or repair purposes.

Although the presently preferred embodiment of this invention has been described, it will be understood that within the purview of the invention various changes may be made within the scope of the following claims.

We claim:

1. A stator assembly for a permanent magnet motor comprising:
   a stator core having a circular first end face and a circular second end face, said end faces having outer margins spaced by and joined to a cylindrical outer wall, said cylindrical outer wall having a center axis, said end faces being centered on a common axis which is coincident with the center axis of said cylindrical outer wall;
   a first set of axially-outwardly projecting coil-retaining members mounted in mutually-spaced relation on the outer margin of said first end face;
   a second set of axially-outwardly projecting coil-retaining members mounted on the outer margin of said second end face, with individual ones of said coil-retaining members of said second set being aligned with individual ones of said coil-retaining members of said first set; and
   wound poles on said stator core formed from individual coils each having sides extending along said outer wall, a first end extending over said first end face and a second end extending over said second end face, and corners joining said sides and said first and second ends, said corners formed around aligned pairs of said first and said second set of coil-retaining members.

2. The stator of claim 1 wherein said wound poles comprise a first phase winding, a second phase windinq, and a third phase winding, said first and second ends of each of the coils of the second phase winding having a portion adjacent one side thereof respectively overlapping said first and second ends of one of said coils of the first phase winding, and said first and second ends of each of the coils of the third phase winding respectively overlapping the first and second ends of both a coil of said first phase winding and a coil of said second phase winding.

3. The stator of claim 2 wherein said first and second ends of the coils of the first phase winding extend over said end faces closer to said center axis than do said first and second ends of the coils of the third phase winding, and closer to said center axis than do the portions of said first and second ends of the coils of the second phase winding that overlap the coils of the first phase winding.

4. The stator of claim 1 further comprising lead wire connections between individual coils of one pole and individual coils of an another pole extending along one of said first and said second end faces.

* * * * *

UNITED STATES PATENT AND TRADEMARK OFFICE
CERTIFICATE OF CORRECTION

PATENT NO. : 5,394,046
DATED : Feb. 28, 1995
INVENTOR(S) : Patrick A. Dolgas et al.

It is certified that error appears in the above-indentified patent and that said Letters Patent is hereby corrected as shown below:

On the title page, "AND STATOR WINDING METHOD AND APPARATUS" should be deleted from the Title.

Column 1, line 16, application page 1, line 9, "and a stator winding method" should be deleted.

Column 1, line 28, application page 1, line 22, "th" should read --that--.

Column 3, line 27, application page 7, line 11, "description" should read --description.--.

Signed and Sealed this

Sixth Day of August, 1996

Attest:

BRUCE LEHMAN

Attesting Officer     Commissioner of Patents and Trademarks